Sept. 21, 1943.    H. G. KELLER    2,330,058
POWER TRANSMISSION CHAIN
Filed July 20, 1942    4 Sheets-Sheet 1
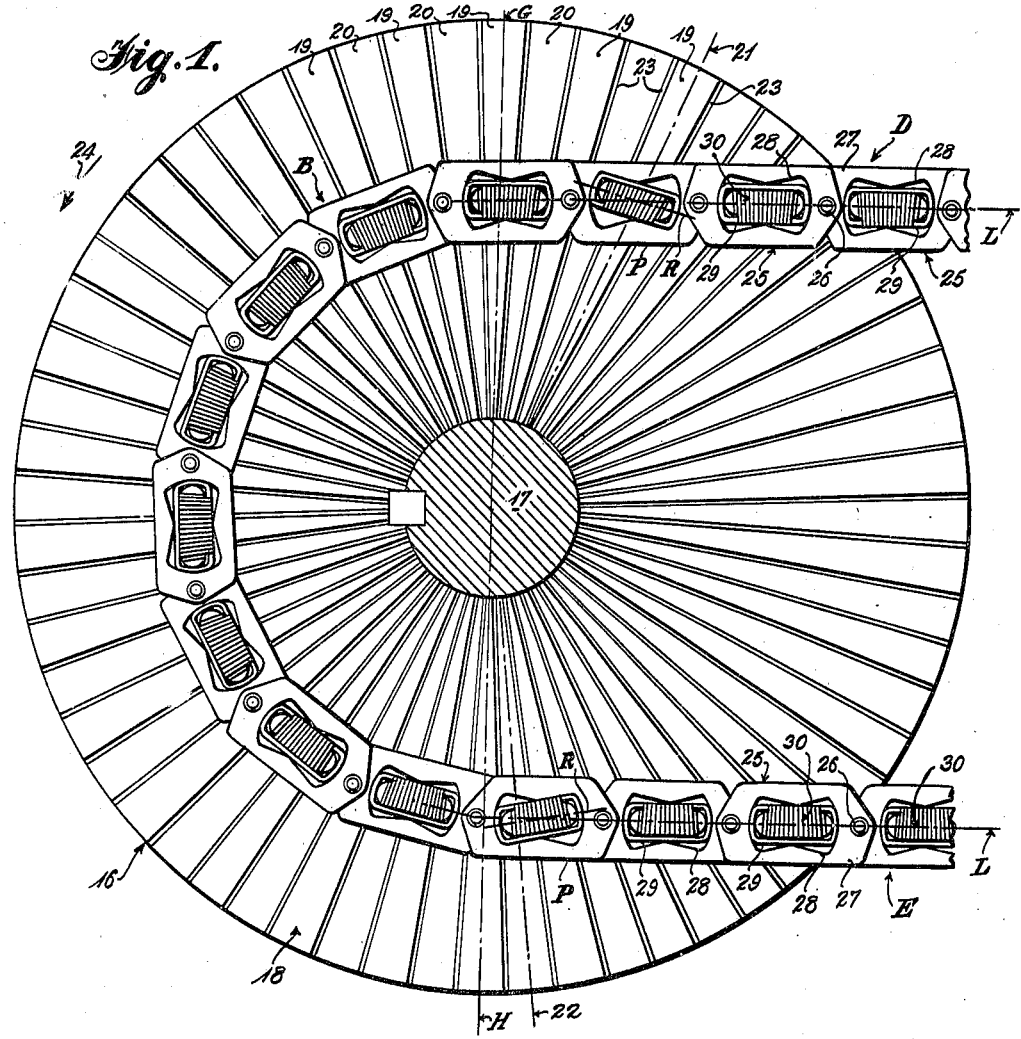
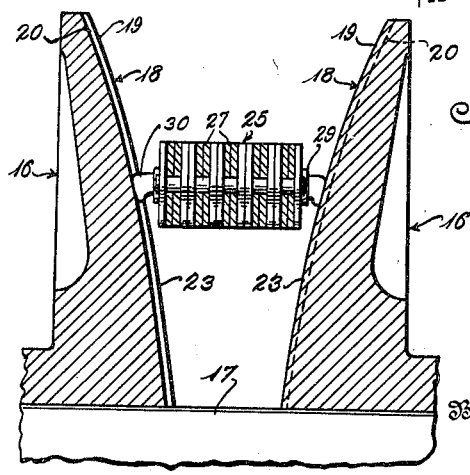
Inventor
Henry G. Keller
By
Attorney Sept. 21, 1943.  H. G. KELLER  2,330,058
POWER TRANSMISSION CHAIN
Filed July 20, 1942  4 Sheets-Sheet 2

Inventor
Henry G. Keller
By L. Donald Myers
Attorney

Sept. 21, 1943.  H. G. KELLER  2,330,058
POWER TRANSMISSION CHAIN
Filed July 20, 1942  4 Sheets-Sheet 3

Inventor
Henry G. Keller
By L. Donald Meyers
Attorney

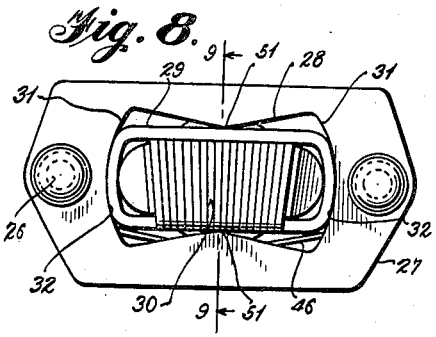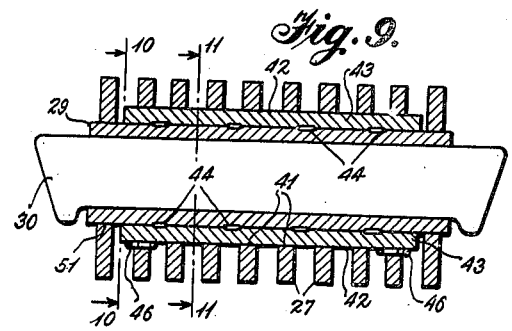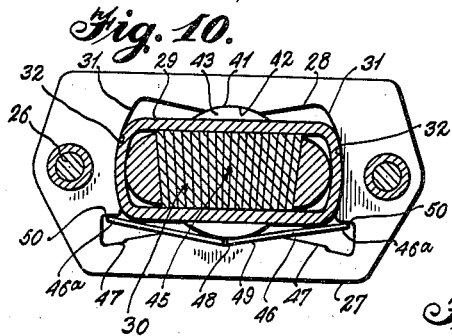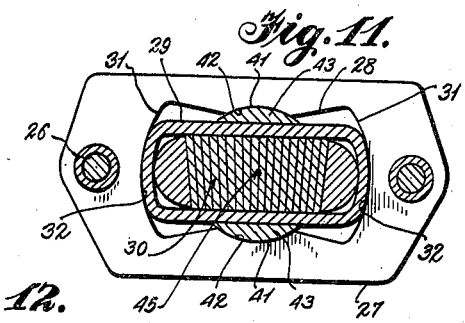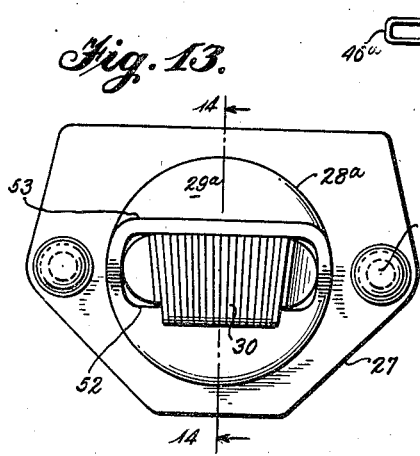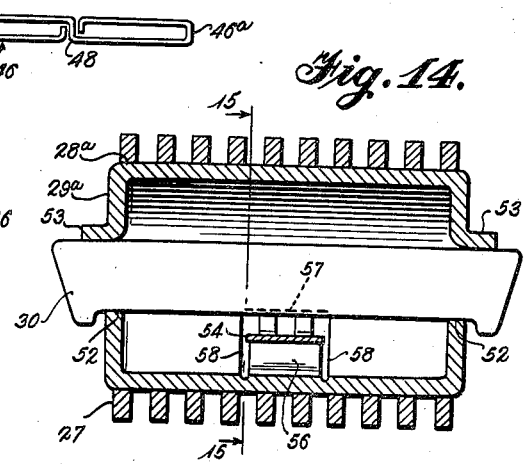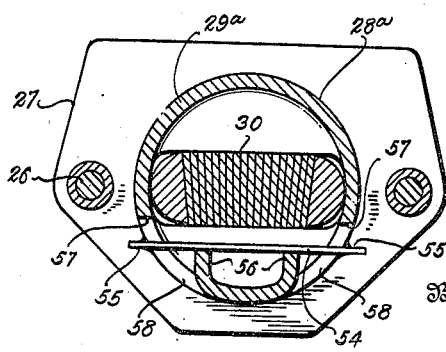

Patented Sept. 21, 1943

2,330,058

UNITED STATES PATENT OFFICE 2,330,058

POWER TRANSMISSION CHAIN

Henry G. Keller, Glenside, Pa., assignor to Link-Belt Company, a corporation of Illinois Application July 20, 1942, Serial No. 451,615

20 Claims. (Cl. 74—245)

This invention relates to new and useful improvements in power transmission chains of the V-type in which packs of slats are employed to provide side engagement with the toothed faces of opposed conical wheels, and deals more particularly with the meshing action of such chains.

Power transmission chains of the side engaging, slat pack type are conventionally employed in infinitely variable speed transmission units of the type that includes expansible and contractible V-pulleys, or pairs of opposed conical wheels, mounted on parallel driver and driven shafts. The opposed wheels of each pair are adjustable toward and away from each other to vary their effective diameters. The drive ratio provided between the two parallel shafts, of course, is determined by the relative effective diameters of the two pulleys.

Conventional chains of the type being considered are formed of links which are pivotally connected at their adjacent ends by chain pins. Each chain link consists of a series of parallel link plates centrally cut away to provide a common transverse opening to receive a cage or frame enclosing a slat pack. The cage or frame is held against movement relative to its chain link. The slat pack is made up of a series of relatively thin, elongated slats, or plates, which are of substantially rectangular formation in side elevation. The several slats of each pack are arranged in direct side surface contact with each other and extend transversely of the chain link through the bore of the cage or frame. The slats of a pack lie in planes which are substantially normal to the center line of their link and thereby normal to the direction of travel of the chain while approaching and departing from a pulley. The slats are of greater length than the cage or frame so as to project beyond both ends of the latter. They are permitted to shift longitudinally relative to each other in opposite directions. This shifting or displacement of the individual slats transversely of the chain is required to permit the pack to adapt itself to the contours of the toothed faces of the opposed wheels.

Conventional V-pulleys have the teeth of opposite wheel faces staggered relative to each other so that each tooth of one face is opposite a tooth space of the other face. Each tooth and tooth space tapers inwardly and has its center line arranged truly radially of the wheel. The teeth and spaces are of uniform depth throughout their lengths. The opposite sides of each tooth are beveled to provide entrance clearance for the slats. The depth of each beveled tooth side is constant throughout its radial length. It will be apparent, therefore, that the lines which define each beveled tooth side are parallel with each other but are not parallel with the truly radial center line of the tooth.

Due to the different effective diameters which can be provided with contractible and expansible V-pulleys, the tangent points for the approach and departure runs of the chain will naturally occupy different circumferential positions with respect to the top and bottom dead center lines of the wheel. When the two pulleys of a transmission unit are conditioned to provide a 1-1 ratio drive, the effective diameters of both pulleys will be the same and all tangent points for both pulleys will substantially coincide with the dead center lines of the pulleys. Any departure from a 1-1 ratio drive, however, causes the tangent points for the pulley having the larger effective diameter to be arranged on the approach and departure sides respectively of the top and bottom dead center lines while the tangent points for the other pulley, which has the smaller effective diameter, will be arranged between said dead center lines.

As the ends of the various chain link slat packs must be fully meshed with the tooth and tooth spaces of the opposed wheels of both pulleys while traveling between the approach and departure tangent points, meshing must be accomplished in advance of the approach tangent point while unmeshing must be accomplished after leaving the departure tangent point.

Meshing and unmeshing of the ends of the slat packs with the tooth and tooth spaces of the opposed wheel faces occur during movement of the pack ends radially of the wheels. This radial movement of the pack ends and the camming action produced by the conical faces and the beveled sides of the teeth during meshing bring about the necessary transverse displacement or shifting of the slats to adapt the packs to the contour of the tooth and tooth spaces of the wheel faces.

It will be apparent from the above reference to the non-radial arrangement of the tooth sides and the possible locations of the tangent points relative to the top and bottom dead center lines of the wheels that the individual slat ends are angularly arranged with respect to the tooth sides during the aforesaid radial meshing and unmeshing movements of the packs. This angular arrangement must necessarily offer resistance or interference to the meshing and unmeshing actions.

Further, the overall dimensions, or thickness, of a slat pack in the direction of travel of the chain is such that each pack meshes with a circumferentially extending wheel area that is equal to at least the combined width of one tooth and one tooth space. Therefore, the meshing and unmeshing of each pack must be progressive in the direction of its thickness or travel, starting with the leading slat.

The resistance or interference during meshing and unmeshing offered by the normal angular position of the slat ends with respect to the tooth sides as well as the progressive meshing and unmeshing of the individual packs impose certain operational limitations on this type of transmission unit which are improvable. For example, meshing and unmeshing interferences determine the permissible drive ratio variations which can be provided. They are in part responsible for certain structural failures caused in operation, more particularly during starting, they contribute noise and uneven action particularly when operating at low speeds.

It is the primary object of this invention to provide power transmission chains of the side engaging, slat pack type which will effect greater ease of meshing and unmeshing.

A further important object of the invention is the provision of power transmission chains of the side engaging, slat pack type which will provide a substantial reduction in the resistance or interference developed during meshing and unmeshing of the slat packs with the tooth and tooth spaces of the pulley wheels.

Another primary object of the invention is to provide a slat pack, side engaging, power transmission chain in which the meshing and unmeshing of the slat packs with the toothed wheel faces may be delayed so that each pack may move substantially as a unit into and out of seating engagement with the wheel faces and thereby preventing interference in any or all packs, that would develop with conventional chains.

Other objects and advantages of the invention will be apparent during the course of the following description.

In the accompanying drawings, forming a part of this specification and in which like numerals are employed to designate like parts throughout the same, Figure 1 is a side or face elevational view of a toothed conical pulley wheel with a slat pack type of power transmission chain operatively associated therewith, Figure 2 is a fragmentary sectional view of a pair of opposed conical wheels having toothed faces and with a slat pack type of transmission chain meshing therewith, Figure 3 is a schematic view of a toothed pulley wheel with a power transmission chain of the slat pack type shown operatively associated therewith in three different positions which are intended to illustrate the maximum, mean and minimum effective diameters which can be provided, Figure 4 shows a development of a V-pulley with its opposed toothed wheels shown in section, and with one form of power transmission chain of the side engaging, slat pack type operatively associated therewith and illustrated in plan, Figure 5 is a detail side elevational view of one link of the chain illustrated in Fig. 4.

Figure 8 is a detail side elevational view of a modified form of side engaging, slat pack type of power transmission chain.

Figure 9 is a transverse vertical sectional view taken on line 9—9 of Fig. 8,

Figure 10 is a longitudinal vertical sectional view taken on line 10—10 of Fig. 9, Figure 11 is a longitudinal, vertical sectional view taken on line 11—11 of Fig. 9, Figure 12 is a detail plan view of a form of a form of spring employed with the type of link illustrated in Figs. 8 to 11 inclusive for yieldably maintaining the slat pack cage in its normal position, Figure 13 is a detail side elevational view of a further modified form of side engaging, slat pack type of power transmission chain, Figure 14 is a transverse vertical sectional view taken on line 14—14 of Fig. 13, and Figure 15 is a longitudinal, vertical sectional view taken on line 15—15 of Fig. 14.

Figure 4:
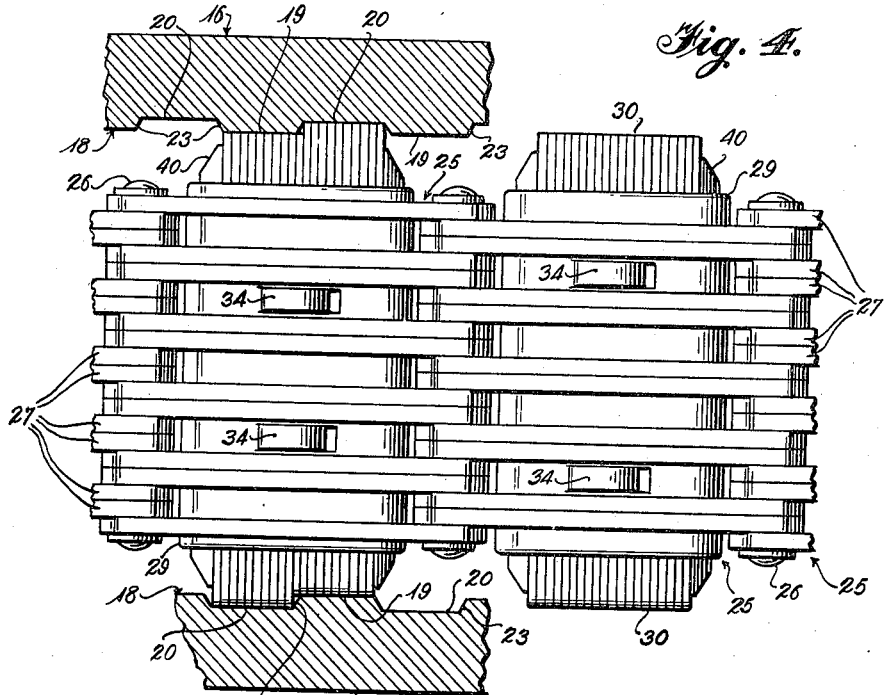
Figure 5:
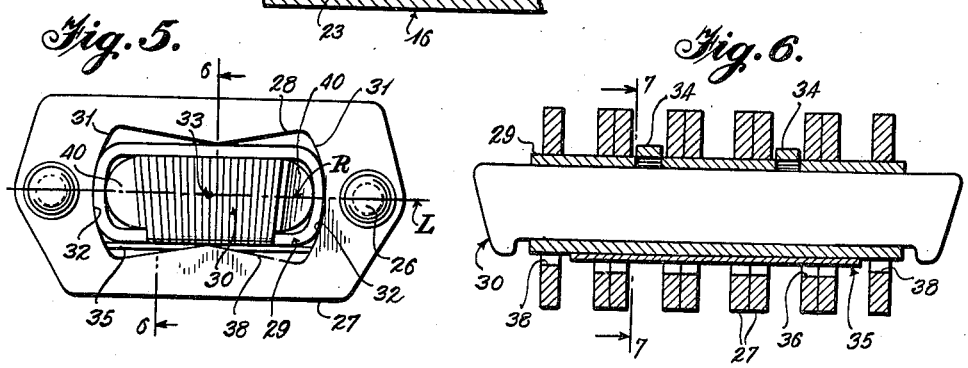
Figure 6:
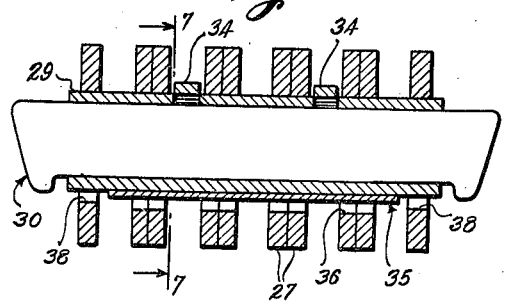
Figure 6 is a transverse, vertical sectional view taken on line 6—6 of Fig. 5.

In the drawings, wherein for the purpose of illustration are shown the preferred embodiments of this invention, and first particularly referring to Figs. 1, 2 and 4, the reference character 16 is employed for generally designating each one of the two conical wheels which collectively form a V-pulley of the expansible and contractible type. One or both of the wheels shown in Figs. 2 and 4 are adapted to be slidably mounted on the shaft 17 so that the toothed faces 18 of the wheels may be moved toward and away from each other to vary the effective diameter of the pulley.

The conical face of each one of these wheels is formed with the radial teeth 19 which are separated by the tooth spaces 20. The teeth 19 of the opposed wheels are staggered with respect to each other, as shown in Figs. 2 and 4. That is to say, the teeth 19 of one wheel are oppositely arranged to the tooth spaces 20 of the other wheel. The tooth and tooth spaces of both wheels are tapered radially inwardly. The center lines of the teeth and of the tooth spaces, as represented by the lines 21 and 22 respectively in Fig. 1, are truly radially arranged. The teeth 19 and the tooth spaces 20 are of constant or uniform depth throughout their radial length. The opposite sides 23 of the teeth are beveled as is clearly shown in Figs. 1, 2 and 4. These beveled sides are of uniform depth throughout the length of each tooth. This constant bevel of tooth sides provides an entrance clearance for the slats. Because the depth of the bevel or side 23 is constant for each tooth, throughout the radial length of the tooth, the lines which define the beveled sides 23 are parallel with each other but they are not truly radially arranged with respect to their respective wheel.

Figure 3:
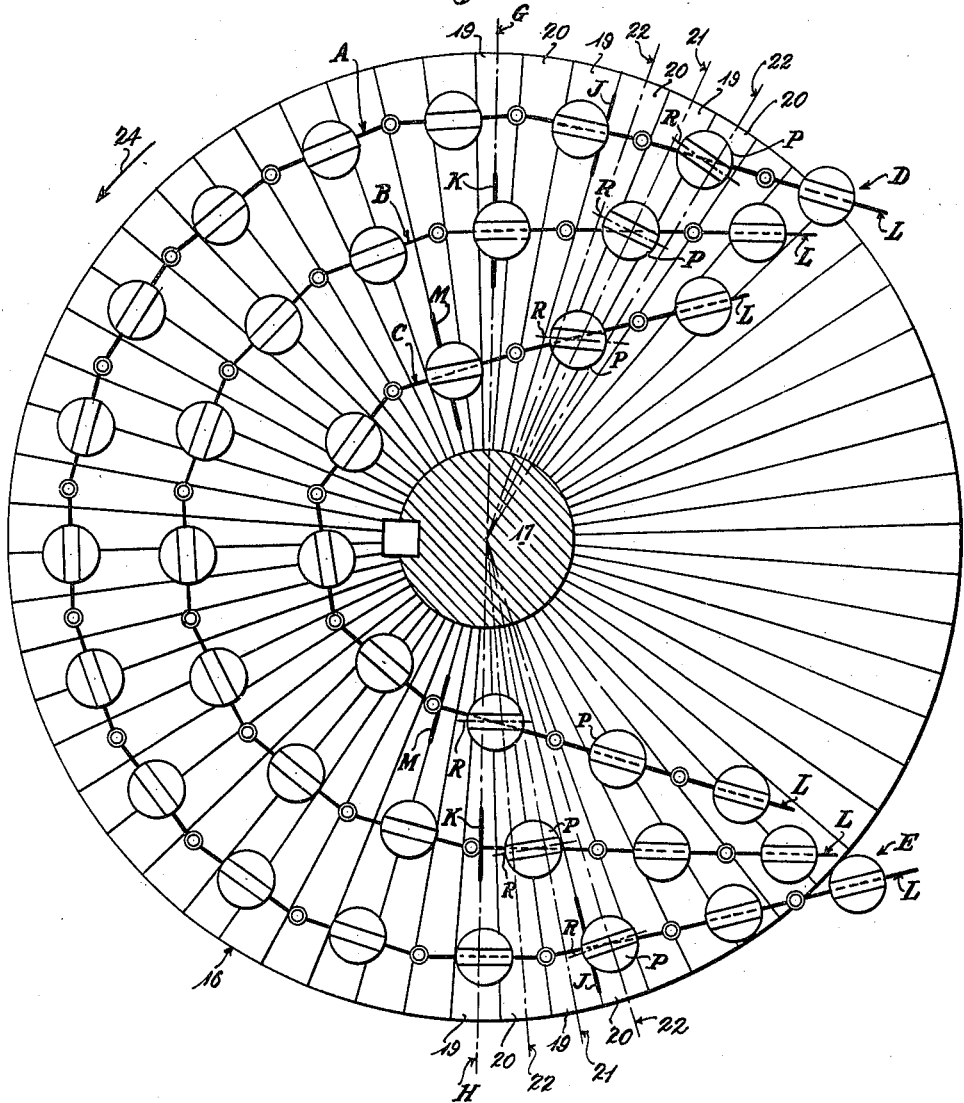

Because the opposed wheels of a V-pulley are contractible and expansible, the effective diameter of the pulley may be varied. The schematic showing of Fig. 3 illustrates a transmission chain in three different positions which represent the maximum effective diameter A, the mean effective diameter B and the minimum effective diameter C. Of course, pulleys of this infinitely variable type of transmission unit can be rotated in either direction. For the sake of clearness and simplicity, it will be considered that the wheel of Figs. 1 and 3 to be rotated in the direction of the arrow 24. With the wheel rotating in the direction of this arrow line, the approach side for the chain will be designated by the reference character D while the departure side will be designated by the reference character E. For each effective diameter of a pulley, the tangent points for both the approach side D and the departure side E will occupy similar circumferential positions with respect to the top and bottom dead center lines of the wheel. The top dead center line is designated in Figs. 1 and 3 by the reference character G. The bottom dead center line is designated in each one of these two figures by the reference character H.

The tangent points for the chain when it occupies the maximum effective diameter position A will be at the intersections of the radial lines J and the center lines L of the chain on the approach and departure sides D and E respectively. It will be noted that these tangent points lie on the approach and departure sides of the top and bottom dead center lines G and H respectively for this maximum effective diameter A. The two tangent points for the mean effective diameter B are located at the points of intersection between the radial lines K and the center lines L of the chain. It will be noted that the radial lines K coincide with the top and bottom dead center lines G and H respectively. For the minimum effective diameter C, the tangent points for both runs of the chain will lie at the points of intersection between the radial lines M and the center lines of the chain runs L. These tangent points are both positioned between the top and bottom dead center lines G and H respectively.

A complete cycle of motion consists of the approach, where any interference of the leading edge of slat pack will oscillate the pack to a substantially radial position after which the chain link rotates about the slat pack which continues its seating until the point of approach tangency is reached. From approach to departure tangency no motion of slat pack occurs within the chain. Beyond departure tangency the slat pack may remain substantially radial until unmeshed sufficiently to prevent resistance to unmeshing.

The slat packs for the various chain links must be fully meshed with the teeth and the tooth spaces of the pulley wheels while traveling between the approach tangent point and the departure tangent point. Therefore, meshing of the ends of the slat packs must be accomplished in advance of the approach tangent point while unmeshing must be accomplished after leaving the departure tangent point.

Since full mesh must be accomplished on approach, also full unmesh on departure, of chain from tangent points respectively; and since the slat packs have their individual slats arranged in planes substantially normal to the center lines L of the runs of the chain, there is considerable adjustment or change required in shifting of the individual slats beyond their normal positions in order to mesh with the changing angles presented by the teeth of the wheel faces. Furthermore, the tooth sides and slat sections are not, at the first contact of chain and tooth face, in an advantageous position to cause the desired movement. Hence resistance to easy movement tends to produce interference. Closer to tangency the differences in angularity of tooth sides and slat sections is progressively reduced until at the point of tangency they are substantially parallel. It is the primary purpose of this invention to operatively associate the various slat packs with their respective chain links so that the individual slats of each pack may occupy planes which substantially correspond with the radial positions of the sides 23 of the wheel face teeth when the slat packs are required to mesh and unmesh. Because the slats of the packs are permitted to assume these positions with respect to the tooth sides, all of the slats of each pack may mesh or seat as a unit and unmesh or unseat as a unit, thereby eliminating the interference encountered in the progressive meshing and unmeshing of conventional chains.

Fig. 1 illustrates the chain in the mean effective diameter position B of Fig. 3. Figs. 1 and 3 illustrate one link P in each of the approach and departure runs of the chain which has its slat arranged so that the center line of the slat pack, which is represented by the reference character R, is angularly arranged with respect to the center line L of its chain run. The slat packs of the links P, therefore, have been shifted or oscillated out of their normal positions so that the planes of the individual slats of these packs will be substantially parallel with the lines that define the beveled sides 23 of the wheel teeth. Because the slats of the packs, during meshing and unmeshing, may shift to substantially coincide with the angles of the tooth sides, very little resistance and no interference is offered during meshing and unmeshing.

Referring next to Figs. 1 and 4, it will be seen that a power transmission chain of the side engaging, slat pack type includes a plurality of links 25 which are pivotally connected at their adjacent ends by means of chain pins 26. Each chain link consists of a series of parallel link plates 27. The plates of adjacent links are overlapped at their associated ends to accommodate the chain pins 26. The series of link plates 27 for each link are centrally cut away to provide a common transverse opening 28 to receive a cage or frame 29. Each cage or frame 29 is of tubular formation and has arranged therein a slat pack 30. The individual slats of each pack are capable of shifting or being displaced transversely of the length of the chain to permit the projecting end portions of the slats to adapt themselves to the contours of the opposing wheel faces. This transverse shifting of the slat packs is clearly illustrated in Fig. 4.

The desired objects of this invention are accomplished by so shaping the common transverse opening 28 of each link and its associated cage or frame 29 that the cage or frame is permitted to partake of limited oscillatory movement with respect to its link. Figs. 1, 2, and 4 to 7 inclusive illustrate one embodiment of the invention which accomplishes this desired result. Figs. 8 to 12 inclusive illustrate one modified form of the invention while Figs. 13 to 15 inclusive illustrate another modification. Although the forms of the invention shown in Figs. 8 to 15 inclusive are not illustrated in assembly views of the character of Figs. 1 and 4, it is to be understood that these Figs. 8 to 15 modifications may be substituted for the form illustrated in the assembly views. The detail structural features of each embodiment of the invention now will be explained.

First referring to Figs. 4 to 7 inclusive, it will be seen that the several link plates 27 are all formed with the same kind of central opening 28. This opening is of elongated formation lengthwise of the link plate and is formed at its opposite ends with arcuate bearing surfaces 31. The cage or frame 29 also is of elongated formation in cross section and is provided with arcuate bearing surfaces 32 that are adapted to cooperate with the end bearing surfaces 31 of the link plates 27. The circumferential lengths of the cage or frame bearing surfaces 32 are less than the circumferential lengths of the bearing surfaces 31 of the link plates and for that reason the cage 29 is permitted to oscillate about the transverse axis 33 from which the bearing surfaces 31 and 32 are struck.

To prevent transverse displacement of each cage or frame 29 with respect to its transverse opening 28, the cage or frame has struck from one wall thereof the tongues 34. The tongues will lie between link plates 27 in the manner clearly illustrated in Figs. 4, 6 and 7. As the normal position of a slat pack with respect to its chain link is with the slat pack center line R aligned with the center line L of the chain, it is necessary for some means to be provided that will yieldably retain the slat pack in its normal position. In the form of the invention shown in Figs. 1 and 4 to 7 inclusive, a steel spring leaf 35 is provided for that purpose. All but the two opposite side link plates 27 are formed in the manner illustrated in Fig. 7. These intermediate link plates are provided with clearance openings 36 for the opposite half portions of the leaf spring 35 to move through. A fulcrum point 37 is located between the clearance openings 36 for each one of these intermediate link plates so that the leaf spring may flex thereabout. The edge 38 of the opening 28 of the two side link plates is formed in the manner illustrated in Fig. 5. These side link plates, therefore, hold the leaf spring 35 against displacement from the common transverse opening formed through the link.

Figure 7:
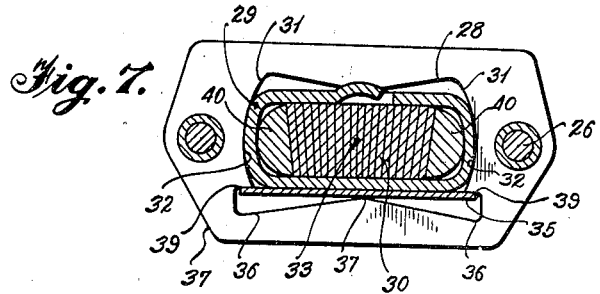
Figure 7 is a longitudinal vertical sectional view taken on line 7—7 of Fig. 6.

By considering the disclosure of Fig. 7 specifically, it will be seen that when the cage or frame 29 oscillates in either direction about the transverse axis 33, one half portion of the leaf spring 35 will be flexed downwardly through the clearance opening 36 of each intermediate link plate 27. The other half portion of the leaf spring will remain in engagement with the fulcrum point 37 and the shoulder 39. When the force that has been applied to the slats of the oscillated cage is removed, the flexed half portion of the leaf spring 35 will move back through the clearance opening 36 until its end portion engages the associated shoulder 39. The leaf spring 35 then will have returned the cage 29 to its normal position where the center line R of the cage and its slat pack will line up with the center line L of the chain.

The pressure or force that causes a chain link cage or frame 29 to oscillate about its axis 33 is developed as a result of the leading slat of each pack engaging either a face surface of a wheel tooth 19 or a beveled side surface 23 of a tooth during the radial inward meshing movement of a link. The cage of each link will be caused to oscillate in the opposite direction as the link unmeshes with the toothed faces of a pulley on the departure side of the latter. The resistance to unmeshing offered by the face surfaces of the wheel teeth and the beveled sides cause the cages to oscillate into the position illustrated in connection with the link P on the departure side E of Fig. 1. It will be appreciated that the power consumed in oscillating the link cages will be stored up in the spring leaves 35 and will be given up again as the flexed leaves are permitted to return to their normal, unflexed conditions.

The form of the invention shown in Figs. 8 to 12 inclusive is very similar to the form shown in the preceding figures. Each link plate 27 is provided with a central opening 28 that is of elongated formation lengthwise of the plate. Each of such openings is provided with an arcuate end bearing surface 31 that is adapted to cooperate with a shorter bearing surface 32 formed on the cage or frame 29.

In this embodiment of the invention, however, the intermediate link plates; that is, all of the link plates 27 with the exception of the two extreme side plates, are provided with additional arcuate bearing surfaces 41 that are adapted to cooperate with the arcuate outer bearing surfaces 42 of the rocker strips 43 that are spot welded at 44 to the inner and outer sides of the cage 29. The various bearing surfaces 31, 32, 41 and 42 are all struck from a common axis 45 and the cage will oscillate about this axis.

Figure 12 discloses a spring 46 which is formed from a suitable strand of spring steel wire. In plan, this spring takes the shape of a figure eight. Fig. 9 discloses two of these springs 46 being used with a link. The link plates that cooperate with these two wire springs are illustrated in Fig. 10 as having clearance openings 47 formed therein through which the end strands 46a of the springs are permitted to move. The intermediate portion 48 of each spring is properly seated in the edge portion 49 of the associated link opening 28. Stop shoulders 50 cooperate with the end strands 46a of the spring for determining the normal position of the slat pack cage 29.

The extreme side link plates are illustrated in Fig. 8. The openings 28 for these link plates are contracted at 51 so that they will overlie the opposite ends of the rocker strips 43 and the outer sides of the intermediate portions 48 of the wire springs 46. This type of oscillatable cage and slat pack will function in the same manner as that described for the preceding embodiment of the invention.

The form of the invention shown in Figs. 13 to 15 inclusive differs substantially from the preceding embodiments of the invention. In this form, each link plate is provided with a circular opening 28a. The cage or frame 29a is of cylindrical formation. Therefore, the entire circumference of the cage 29a cooperates with the entire edge area of each link plate opening 28a for providing an oscillating bearing for the cage. The opposite side walls of the cage are provided with openings 52 to accommodate the end portions of the slat pack 30. A lip 53 is formed about a substantial portion of each side opening 52 for the purpose of providing a greater contact area between the various slats of the pack and the cage.

To yieldably hold the cage in its normal position, a steel spring leaf 54 is provided. The end portions of this leaf spring are seated in notches 55 formed in certain ones of the intermediate chain link plates. Abutment fingers 56 are struck up from the peripheral wall of the cylindrical cage 29a and bear against the intermediate portion of the leaf spring 54. Oscillatory movement of the cage 29a in opposite directions is limited by engagement of the abutment surfaces 57, formed on the cage, with the end portions of the leaf spring 54.

This type of spring performs the added function of limiting transverse displacement of the cage 29a relative to its link opening. It will be seen that the longitudinal edges of the leaf spring will engage edges 58 formed on the cage 29a as a result of striking up the abutments 56. Additionally, the end portions of the leaf spring 54 will engage side surfaces of the adjacent link plates 27 which are not provided with the notches 55 to receive the leaf spring ends.

This modified form of chain link and oscillatory slat pack and cage will function in the same manner as the embodiments of the invention disclosed in the preceding figures. Therefore, no further description of the mode of operation of this link construction need be provided.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. In a power transmission chain, a plurality of links pivotally connected by chain pins, a cage member for each chain link, means for connecting each cage member to its link so as to permit the cage member to partake of limited oscillatory movements relative to the link and about the transverse axis of the link, and a pack of slats mounted in each cage member for limited transverse movement.

2. In a power transmission chain, a plurality of links pivotally connected by chain pins, each link being centrally cut away to provide a transverse opening, a cage member positioned in each transverse opening, the cross sectional shape of each transverse opening and its cage being such that the cage is permitted to partake of limited oscillatory movements relative to the link, and a pack of slats mounted in each cage member for limited transverse displacement.

3. In a power transmission chain, a plurality of links pivotally connected by chain pins, a cage member for each chain link, means for connecting each cage member to its link so as to permit the cage member to partake of limited oscillatory movements relative to the link and about the transverse axis of the link, a pack of slats mounted in each cage member for limited transverse movement, and spring means for yieldably holding each cage in its normal position.

4. In a power transmission chain, a plurality of links pivotally connected by chain pins, each link being centrally cut away to provide a transverse opening, a cage member positioned in each transverse opening, the cross sectional shape of each transverse opening and its cage being such that the cage is permitted to partake of limited oscillatory movements relative to the link, a pack of slats mounted in each cage member for limited transverse displacement, and spring means for yieldably resisting oscillatory movement of each cage relative to its link and for restoring the cage to its normal position after movement thereof.

5. In a power transmission chain, a plurality of links pivotally connected by chain pins, each link being centrally cut away to provide a transverse opening, a cage member positioned in each transverse opening, the cross sectional shape of each transverse opening and its cage being such that the cage is permitted to partake of limited oscillatory movements relative to the link about the transverse axis of the link, and a pack of slats mounted in each cage member and projecting from opposite sides thereof, the individual slats of each pack being supported for limited transverse displacement.

6. In a power transmission chain, a plurality of links pivotally connected by chain pins, each link being centrally cut away to provide a common transverse opening, a cage member positioned in each transverse opening, the cross sectional shape of each transverse opening and its cage being such that the cage is permitted to partake of limited oscillatory movements relative to the link, bearing means operatively associated with each cage and its link for supporting the cage for oscillatory movement, and a pack of slats mounted in each cage member for limited transverse displacement.

7. In a power transmission chain, a plurality of links, each one of which is formed of a set of parallel link plates, the end portions of the link plates of adjacent sets being overlapped and pivotally connected by chain pins, the set of plates of each link being centrally cut away to provide a common transverse opening, a cage member positioned in each transverse opening, the cross sectional shape of each transverse opening and its cage being such that the cage is permitted to partake of limited oscillatory movements relative to the link, means operatively associated with each cage and its link for preventing transverse displacement of the cage in the link opening, and a pack of slats mounted in each cage member for limited transverse displacement.

8. In a power transmission chain, a plurality of links, each one of which is formed of a set of parallel link plates, the end portions of the link plates of adjacent sets being overlapped and pivotally connected by chain pins, the set of plates of each link being centrally cut away to provide a common transverse opening, a cage member positioned in each transverse opening, the cross sectional shape of each transverse opening and its cage being such that the cage is permitted to partake of limited oscillatory movements relative to the link, bearing means operatively associated with each cage and its link for supporting the cage for oscillatory movement, means operatively associated with each cage and its link for preventing transverse displacement of the cage in the link opening, and a pack of slats mounted in each cage member for limited transverse displacement.

9. In a power transmission chain, a plurality of links, each one of which is formed of a set of parallel link plates, the end portions of the link plates of adjacent sets being overlapped and pivotally connected by chain pins, the set of plates of each link being centrally cut away to provide a common transverse opening, a cage member positioned in each transverse opening, the cross sectional shape of each transverse opening and its cage being such that the cage is permitted to partake of limited oscillatory movements relative to the link, bearing means operatively associated with each cage and its link for supporting the cage for oscillatory movement, a pack of slats mounted in each cage member for limited transverse displacement, and spring means for yieldably resisting oscillatory movement of each cage relative to its link and for restoring the cage to its normal position after movement thereof.

10. In a power transmission chain, a plurality of links, each one of which is formed of a set of parallel link plates, the end portions of the link plates of adjacent sets being overlapped and pivotally connected by chain pins, the set of plates of each link being centrally cut away to provide a common transverse opening, a cage member positioned in each transverse opening, the cross sectional shape of each transverse opening and its cage being such that the cage is permitted to partake of limited oscillatory movements relative to the link, means operatively associated with each cage and its link for preventing transverse displacement of the cage in the link opening, a pack of slats mounted in each cage member for limited transverse displacement, and spring means for yieldably resisting oscillatory movement of each cage relative to its link and for restoring the cage to its normal position after movement thereof.

11. In a power transmission chain, a plurality of links, each one of which is formed of a set of parallel link plates, the end portions of the link plates of adjacent sets being overlapped and pivotally connected by chain pins, the set of plates of each link being centrally cut away to provide a common transverse opening, a cage member positioned in each transverse opening, the cross sectional shape of each transverse opening and its cage being such that the cage is permitted to partake of limited oscillatory movements relative to the link, bearing means operatively associated with each cage and its link for supporting the cage for oscillatory movement, means operatively associated with each cage and its link for preventing transverse displacement of the cage in the link opening, a pack of slats mounted in each cage member for limited transverse displacement, and spring means for yieldably resisting oscillatory movement of each cage relative to its link and for restoring the cage to its normal position after movement thereof.

12. In a power transmission chain, a plurality of links, each one of which is formed of a set of parallel link plates, the end portions of the link plates of adjacent sets being overlapped and pivotally connected by chain pins, a cage member for each chain link, a pack of slats transversely displaceably mounted in each cage member and projecting beyond opposite sides of their link for meshing with the radial teeth formed on the faces of opposed conical wheels of a V-pulley while traveling therearound, and means for connecting each cage member to its chain link for relative movement about an axis arranged transversely of the link to permit the slats to assume the different angular positions with respect to the center line of the link, while meshed and during meshing and unmeshing movements of the pack, which correspond with the angles formed by the teeth of the wheels and said link center line.

13. In a power transmission chain, a plurality of links, each one of which is formed of a set of parallel link plates, the end portions of the link plates of adjacent sets being overlapped and pivotally connected by chain pins, a cage member for each chain link, a pack of slats transversely displaceably mounted in each cage member and projecting beyond opposite sides of their link for meshing with the radial teeth formed on the faces of opposed conical wheels of a V-pulley while traveling therearound, means for connecting each cage member to its chain link for relative movement about an axis arranged transversely of the link to permit the slats to assume the different angular positions with respect to the center line of the link, while meshed and during meshing and unmeshing movements of the pack, which correspond with the angles formed by the teeth of the wheels and said link center line, and spring means yieldably resisting such relative movement between each cage and its link.

14. In a power transmission chain, a plurality of links, each one of which is formed of a set of parallel link plates, the end portions of the link plates of adjacent sets being overlapped and pivotally connected by chain pins, the sets of plates of each link being centrally cut away to provide a common transverse opening which is elongated in the direction of the length of the link and is provided with arcuate end bearing surfaces that are struck from the transverse axis of the link, a tubular cage member extending through each transverse opening, said cage members each being of elongated formation in transverse section and having arcuate bearing surfaces which cooperate with the bearing surfaces of the link opening, the bearing surfaces of each cage being of less circumferential length than the bearing surfaces of its link opening, whereby the cage will be permitted to partake of limited oscillatory movement with respect to the link, and a pack of slats mounted in the bore of each cage member for limited transverse displacement.

15. In a power transmission chain, a plurality of links, each one of which is formed of a set of parallel link plates, the end portions of the link plates of adjacent sets being overlapped and pivotally connected by chain pins, the set of plates of each link being centrally cut away to provide a common transverse opening of circular formation in cross section, a cage member of circular formation in cross section, supported in each transverse opening for oscillatory movements, and a pack of slats mounted in each member for limited transverse movement.

16. In a power transmission chain, a plurality of links, each one of which is formed of a set of parallel link plates, the end portions of the link plates of adjacent sets being overlapped and pivotally connected by chain pins, the set of plates of each link being centrally cut away to provide a common transverse opening which is elongated in the direction of the length of the link and is provided with arcuate end bearing surfaces that are struck from the transverse axis of the link, a tubular cage member extending through each transverse opening, said cage members each being of elongated formation in cross section and having arcuate bearing surfaces which cooperate with the bearing surfaces of the link opening, the bearing surfaces of each cage being of less circumferential length than the bearing surfaces of its link opening whereby the cage will be permitted to partake of limited oscillatory movement with respect to the link, a pack of slats mounted in the bore of each cage member for limited transverse movement, and spring means for yieldably resisting oscillatory movements of each cage relative to its link.

17. In a power transmission chain, a plurality of links, each one of which is formed of a set of parallel link plates, the end portions of the link plates of adjacent sets being overlapped and pivotally connected by chain pins, the set of plates of each link being centrally cut away to provide a common transverse opening of circular formation in cross section, a cage member of circular formation in cross section supported in each transverse opening for oscillatory movements, a pack of slats mounted in each cage member for limited transverse movement, and spring means for yieldably resisting oscillatory movements of each cage relative to its link.

18. In a power transmission chain of the side engaging, slat pack type, a chain link centrally cut away to provide a transverse opening, a cage journaled in said transverse opening for oscillatory movements, and a pack of slats mounted in the cage for limited transverse displacement.

19. In a power transmission chain of the side engaging, slat pack type, a chain link centrally cut away to provide a transverse opening, a cage member journaled in said transverse opening for oscillatory movements, means for limiting the extent of oscillatory movements of the cage, and a pack of slats mounted in the case for limited transverse displacement.

20. In a power transmission chain of the side engaging, slat pack type, a chain link centrally cut away to provide a transverse opening, a cage journaled in said transverse opening for oscillatory movements, means for limiting the extent of oscillatory movement of the cage, spring means for yieldably resisting oscillatory movements of the cage relative to the link, and a pack of slats mounted in the cage for limited transverse displacement.

HENRY G. KELLER.